(12) United States Patent
Fukumoto (10) Patent No.: US 11,555,613 B2
(45) Date of Patent: Jan. 17, 2023

(54) GAS GENERATOR

(71) Applicant: DAICEL CORPORATION, Osaka (JP)

(72) Inventor: Kenji Fukumoto, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 511 days.

(21) Appl. No.: 16/489,233

(22) PCT Filed: Mar. 13, 2018

(86) PCT No.: PCT/JP2018/009604
§ 371 (c)(1),
(2) Date: Aug. 27, 2019

(87) PCT Pub. No.: WO2018/186116
PCT Pub. Date: Oct. 11, 2018

(65) Prior Publication Data
US 2020/0063966 A1    Feb. 27, 2020

(30) Foreign Application Priority Data

Apr. 4, 2017  (JP) .............................. JP2017-074279

(51) Int. Cl.
*B60R 21/264* (2006.01)
*F23R 5/00* (2006.01)
*C06D 5/00* (2006.01)

(52) U.S. Cl.
CPC ............ *F23R 5/00* (2013.01); *B60R 21/2644* (2013.01); *C06D 5/00* (2013.01)

(58) Field of Classification Search
CPC .............. B60R 21/264; B60R 21/2644; B60R 21/2646
See application file for complete search history.

(56) References Cited

U.S. PATENT DOCUMENTS 5,772,243 A * 6/1998 Green .................. B60R 21/2644
                                                                102/202.14
5,833,264 A    11/1998 Honda et al.
(Continued)

FOREIGN PATENT DOCUMENTS

CN         1399597 A      2/2003
CN       104981381 A     10/2015
(Continued)

OTHER PUBLICATIONS

International Preliminary Report on Patentability and English translation of the Written Opinion of the International Searching Authority for International Application No. PCT/JP2018/009604, dated Oct. 17, 2019.

*Primary Examiner* — Barry Gooden, Jr.
(74) *Attorney, Agent, or Firm* — Birch, Stewart, Kolasch & Birch, LLP (57) ABSTRACT

A gas generator includes, a housing provided with a gas discharge port, an ignition chamber, accommodating an igniter and a transfer charge, provided on an end portion of the housing, a combustion chamber disposed within the housing and accommodating a gas generating agent, a rupturable closing member partitioning the combustion chamber from the ignition chamber and including a rupturable portion ruptured upon an actuation of the gas generator, and an inner tube extending from the closing member toward the gas discharge port inside the combustion chamber. The inner tube defines outside thereof a space containing the gas generating agent, and defines inside a hollow space. The inner tube is provided with a plurality of through holes. The inner tube includes one end communicating the hollow space with the ignition chamber to transfer the transfer charge in a burning state toward an opposite end when the rupturable portion is ruptured.

14 Claims, 3 Drawing Sheets

(56) References Cited

U.S. PATENT DOCUMENTS

| | | | | |
|---|---|---|---|---|
| 5,845,933 | A | * | 12/1998 | Walker ................ B60R 21/2644 280/741 |
| 10,618,495 | B1 | * | 4/2020 | Ganta ................. C06B 21/0025 |
| 2002/0190511 | A1 | | 12/2002 | Watase et al. |
| 2005/0218637 | A1 | * | 10/2005 | Burns ....................... F02K 9/20 280/741 |
| 2006/0151977 | A1 | * | 7/2006 | Yamazaki ........... B60R 21/2644 280/736 |
| 2006/0207468 | A1 | * | 9/2006 | Blackburn .......... B60R 21/2644 102/530 |
| 2007/0024038 | A1 | | 2/2007 | Numoto et al. |
| 2010/0045009 | A1 | * | 2/2010 | Kelley ................ B60R 21/2644 280/741 |
| 2014/0239623 | A1 | | 8/2014 | Tokuda et al. |
| 2019/0077360 | A1 | * | 3/2019 | Imai ...................... B60R 21/264 |
| 2019/0359166 | A1 | * | 11/2019 | Jung ...................... B60R 21/36 |

FOREIGN PATENT DOCUMENTS

| | | |
|---|---|---|
| JP | 5-92747 A | 4/1993 |
| JP | 9-132104 A | 5/1997 |
| JP | 2003-2153 A | 1/2003 |

\* cited by examiner

GAS GENERATOR

TECHNICAL FIELD

The present invention relates to a gas generator that can be used for an airbag device mounted in an automobile.

BACKGROUND ART

In side-impact airbag devices for automobiles, an elongated gas generator is used due to the constraints on a mounting portion therefor. Such an elongated gas generator is generally configured to ignite at one end thereof and discharge gas from the other end. In such a gas discharge form, it is important that the combustion of the gas generating agent and the gas discharge smoothly occur.

JP H05-92747A discloses an airbag inflator in which an igniter 7 is disposed at one end and a gas outflow port (gas discharge port) 2 is formed in a peripheral wall of a container (housing) 1.

Inside the housing 1 (combustion chamber 3), a plurality of gas generating agent formed bodies 5 are arranged in the axial direction, and the gas generating agent formed bodies 5 each have a shape including a through hole extending through the center portion thereof. Therefore, when the plurality of gas generating agent formed bodies 5 are aligned in the axial direction, a through hole extending from one end to the other end of the housing is formed. There is a section filled with combustion material pellets 6 and positioned in parallel to the combustion chamber 3, and this section and the combustion chamber 3 are partitioned by a seal 14. A cylindrical member is formed between the combustion chamber 3 and an outer filter 10, and gas outlets 4 are formed in the peripheral wall of the cylindrical member.

JP 2003-002153A discloses an igniter 23 provided at one end side of a cylindrical housing 1 having closed ends, and gas discharge holes 8 formed in the peripheral wall on the other end side.

Upon actuation, an igniter 23 is actuated to burn a first transfer charge 22, and further burn a second transfer charge 18 in a fire transfer means 3. As a result, flames and the like are discharged from a fire transfer nozzle 28 into a hollow space 17. The flames and the like discharged into the hollow space 17 enter the interior of an inner cylinder 5 through gas passage holes 15 of the inner cylinder 5, and ignite and burn a gas generating agent 4, resulting in generation of high-temperature gas. The high-temperature gas enters the hollow space 17 through the gas passage holes 15 and breaks a burst plate 14. Then, the high-temperature gas enters a filter chamber 12, passes through a filter member 10, and then is discharged from the gas discharge holes 8.

SUMMARY OF INVENTION

The present invention provides a gas generator including: an ignition chamber including an igniter on a side of a first end portion of a cylindrical housing; a diffuser portion including a gas discharge port on a side of a second end portion of the cylindrical housing, the second end portion being on an axially opposite side to the first end portion; and a combustion chamber disposed between the ignition chamber and the diffuser portion and containing a molded article of a gas generating agent, the ignition chamber and the combustion chamber being partitioned by a partially rupturable closing member.

In the gas generator, a molded article of a transfer charge is contained in the ignition chamber, and the closing member that is partially rupturable is ruptured due to an increase in a pressure in the ignition chamber, the combustion chamber and the diffuser portion communicate with each other, an inner tube is disposed in the combustion chamber, the inner tube extends from the side of the first end portion of the cylindrical housing toward the second end portion of the cylindrical housing, and the molded article of the gas generating agent is contained in a space surrounding the inner tube, the inner tube is a hollow tube having a peripheral wall including a plurality of through holes, the inner tube has a first end portion that is open on a side of the ignition chamber, and a second end portion that is closed on an axially opposite side to the first end portion, an opening of the first end portion of the inner tube is in contact with a rupturable portion of the closing member, and the closed second end portion of the inner tube extends toward the diffuser portion, a minimum inner diameter (Dmin) of the inner tube is larger than a maximum length (Lmax) of the molded article of the transfer charge, and when the closing member is ruptured, the hollow tube serves as a space through which the molded article of the transfer charge travels to the second end portion of the inner tube.

Further, the present invention provides a method for igniting the molded article of the gas generating agent contained in the combustion chamber of the gas generator described above, the method including:

1) actuating the igniter to ignite and burn the transfer charge in the ignition chamber to increase a pressure in the ignition chamber;

2) rupturing a rupturable portion of the closing member by the increased pressure in the ignition chamber to allow the ignition chamber and the inner tube to communicate with each other;

3) discharging the molded article of the transfer charge in a burning state in the ignition chamber into the inner tube and transferring the molded article of the transfer charge in the burning state toward the closed second end portion; and 4) ejecting, from the through holes, a combustion product generated from the molded article of the transfer charge continuously burning in the inner tube, and igniting and burning the molded article of the gas generating agent in the combustion chamber.

BRIEF DESCRIPTION OF DRAWINGS

The present invention will be more fully understood from the following detailed description and the accompanying drawings. However, the detailed description and the drawings are merely provided for the purpose of illustration and are not intended to limit the present invention.

DESCRIPTION OF EMBODIMENTS

The present invention provides a gas generator that can shorten discharge time of combustion gas and shorten an inflation start time of an airbag, even if the gas generator is a gas generator in which an elongated cylindrical housing thereof contains a gas generating agent formed body.

The cylindrical housing is made of metal such as iron or stainless steel and has a circular cross section. The cross-section is not limited to a circular shape.

The cylindrical housing is opened at a first end portion and a second end portion. The first end portion is closed by an igniter attached thereto. The second end portion is closed by a diffuser portion attached thereto.

For the cylindrical housing, a housing in which an opening at one of end portions is closed by employing, for example, a deep drawing process can be used, and a gas discharge port may be formed on that closed end portion side to form a diffuser portion.

An ignition chamber includes a known electric igniter and a known transfer charge formed body.

The igniter is attached on the opening side of the first end portion of the cylindrical housing. In addition to the known transfer charge formed body, the transfer charge formed body may include a gas generating agent formed body that functions as a transfer charge.

A partially rupturable closing member serving as a partition between the ignition chamber and a combustion chamber is a plate-shaped member or a box-shaped member having a bottom surface and a side surface, and is made of iron or stainless steel.

The partially rupturable closing member is partially ruptured when the pressure in the ignition chamber increases. As the partially rupturable closing member, it is possible to use an closing member in which a weakened portion, such as a notch having a "+" shape, or a circular thinned portion, is formed in a part to be ruptured. The rupturable portion of the closing member is a portion facing an inner space of an inner tube, which will be described later, that is, a portion facing an opening at a first end portion of the inner tube.

A molded article if a gas generating agent is contained in a tubular space, that is a space in the combustion chamber excluding the inner tube. The molded article of the gas generating agent contained in the combustion chamber can be of the same type as gas generating agents for inflating airbags, used in known gas generators.

The diffuser portion includes a gas discharge port(s), and is preferably formed of the same material as that of the cylindrical housing.

The shape and structure of the diffuser portion is not particularly limited as long as the diffuser portion includes the gas discharge port and a gas passage port(s) that allows the combustion chamber to communicate with the interior space of the diffuser portion. For example, it is possible to use a diffuser portion formed of a single cup member including a peripheral wall having the gas discharge port formed therein and an opening serving as the gas passage port, or a diffuser portion formed of a combination of a plurality of cup members including a peripheral wall having the gas passage port and the gas discharge port.

A communication port (gas passage port) that allows the diffuser portion to communicate with the combustion chamber can be formed at an axially opposite position with respect to the ignition chamber in the cylindrical housing, or alternatively, may be positioned to face, in a direction perpendicular to the axial direction of the cylindrical housing, the inner peripheral wall surface of the cylindrical housing with a gap therebetween.

The inner tube is a hollow tube made of metal, such as iron or stainless steel, and having, in the peripheral wall thereof, through holes through which a combustion product such as flame or high-temperature gas passes.

The inner tube may have a constant inner diameter and a constant outer diameter; an inner diameter and an outer diameter each being non-constant and partially varied (for example, an inner tube having a larger inner diameter at and near the opening of the first end portion); an inner diameter and an outer diameter reduced stepwise from the first end portion to the second end portion; or an inner diameter and an outer diameter continuously reduced from the first end portion to the second end portion.

Preferably, in the inner tube, a large number of the through holes are formed and dispersed between the first end portion and the second end portion.

Preferably, the second end portion of the inner tube is positioned further toward the diffuser portion side than a middle position (0.5 L, where L is a length between the closing member and the diffuser portion). In other words, the second end portion of the inner tube is preferably positioned closer to the diffuser portion. More preferably, the second end portion of the inner tube is positioned further toward the diffuser portion side than a position of 0.7 L from the closing member. Still more preferably, the second end portion of the inner tube is positioned further toward the diffuser portion side than a position of 0.8 L from the closing member.

The first end portion side of the inner tube is preferably fixed in a state in which the opening is in contact with the rupturable portion of the closing member, and more preferably the opening of the first end portion surrounds the rupturable portion of the closing member.

A method for fixing the inner tube is not particularly limited. Thus, the inner tube may be fixed in a state in which the first end portion is in contact with the closing member and the second end portion is in contact with the diffuser portion; a state in which the first end portion is surrounded by an annular fixing member fitted in the cylindrical housing; a state in which the opening of the first end portion is fitted onto a convex portion (a tip of the convex portion serves as a rupturable portion) of a rupture member; and/or a state in which the opening of the second end portion of the inner tube is closed by being fitted onto a convex portion formed at the diffuser portion, for example.

The minimum inner diameter (Dmin) of the inner tube is greater than the maximum length (Lmax) of the molded article of the transfer charge. The minimum inner diameter (Dmin) of the inner tube is the smallest inner diameter when the inner diameter of the inner tube is not constant. When the inner diameter of the inner tube is constant, the minimum inner diameter (Dmin) of the inner tube is the constant inner diameter.

The maximum length (Lmax) of the molded article of the transfer charge is the diameter in a case of a sphere-shaped molded article of the transfer charge, the major axial length in a case of an ellipsoid-shaped molded article of the transfer charge, the length in a case of a column-shaped molded article of the transfer charge, the diameter in a case of a disc-shaped molded article of the transfer charge, or the length of the longest portion in a case of an indefinitely shaped molded article of the transfer charge (such as a partially deformed spherical shape). In other words, Lmax is, for a single particle of the molded article of the transfer charge, the longest of the diameter, major axis length, and length of a side.

Since the opening on the first end portion side of the inner tube is in contact with the rupturable portion of the closing member, once the rupturable portion of the closing member is ruptured and opened by increased pressure in the ignition chamber during actuation, the ignition chamber and the inner tube communicate with each other. A portion other than the rupturable portion in the closing member is not ruptured.

Since the above described relationship of Dmin>Lmax is satisfied once the closing member is ruptured at a time when pressure in the ignition chamber is the sufficiently increased thereby establishing the communicated state, the molded articles of the transfer charge in a burning state in the ignition chamber are injected from the opening of the first end portion of the inner tube into the interior of the inner tube, and travel through the hollow tube toward the second end portion of the inner tube. At this time, regarding dispersion density of the molded articles of the transfer charge between the first end portion and the second end portion of the inner tube, with the molded article of the transfer charge having been transferred and being in a burning state, the dispersion density on the second end portion side is higher and the dispersion density on the first end portion side is lower.

Thereafter, high-temperature gas discharged from the molded article of the transfer charge in a burning state flows through the through holes of the inner tube into the combustion chamber, and thus, the molded article of the gas generating agent is ignited and burned. At this time, the molded article of the gas generating agent in contact with the second end portion side of the inner tube close to the diffuser portion, in which the dispersion density of the molded article of the transfer charge in a burning state increases, is more likely to burn. As a result, the period of time from the actuation of the igniter until the discharge of the combustion gas via the gas discharge port becomes shorter. Thus, even when the elongated cylindrical housing is used, it is possible to shorten a period of time from the actuation of the igniter until the start of discharge of the gas by the combustion of the molded article of the gas generating agent (the start of discharge of gas from the gas discharge port).

In a preferred embodiment of the gas generator according to the present invention, the molded article of the transfer charge contained in the ignition chamber is a pellet-like body. A ratio (Lmax/Dmin) of a maximum length (Lmax) of the molded article of the transfer charge, which is the pellet-like body in this case, to a minimum inner diameter (Dmin) of the inner tube is preferably in a range from 0.1 to 0.6.

When Lmax/Dmin=0.1 to 0.6, the transfer of the molded articles of the transfer charge in a burning state toward the second end portion in the inner tube is facilitated upon actuation. Therefore, the period of time from the actuation of the igniter until the start of discharge of the gas can be advantageously shortened.

In a preferred embodiment of the gas generator of the present invention, regarding the plurality of through holes formed in the peripheral wall of the inner tube, opening area of the through holes per unit area increases from the first end portion toward the second end portion, and an opening diameter of the through hole is smaller than a shortest portion of the molded article of the gas generating agent contained in the combustion chamber.

The shortest portion is the shortest of the diameter, major axis length, and length of a side of a particle of the gas generating agent.

Examples of configurations in which the opening area of the plurality of through holes per unit area increases from the first end portion toward the second end portion include a configuration in which the opening diameters of the through holes are all the same and the number of through holes per unit area is increased, and a configuration in which the opening diameters of the through holes are not the same, the number density of the through holes is constant from the first end portion to the second end portion, and the opening diameters of the through holes increase stepwise or continuously from the first end portion toward the second end portion.

When, the opening area of the plurality of through holes per unit area increases from the first end portion toward the second end portion, the molded articles of the gas generating agent in contact with the second end portion side of the inner tube that is close to the diffuser portion are more likely to burn. As a result, the period of time until the discharge of the combustion gas via the gas discharge port becomes shorter, and thus, the period of time from the actuation of the igniter until the start of discharge of the gas can be advantageously shortened.

In a preferred embodiment of the gas generator of the present invention, a ratio (Dmax/D) of a maximum outer diameter (Dmax) of the inner tube to an inner diameter (D) of the cylindrical housing is from 0.15 to 0.50.

When Dmax/D=0.15 to 0.50, sufficient volume of the combustion chamber can be ensured, and the transfer of the molded articles of the transfer charge in a burning state in the inner tube is facilitated.

In a preferred embodiment of the gas generator of the present invention, the diffuser portion includes a combination of a first cup member and a second cup member, the first cup member includes a first bottom portion, a first peripheral wall including a plurality of gas discharge ports formed therein, and a first opening, and the second cup member includes a second bottom portion, a second peripheral wall including a plurality of gas passage ports formed therein, and a second opening, wherein the first cup member and the second cup member are provided such that a side of the second opening of the second cup member is fitted into the first opening of the first cup member, and an inner surface of the first peripheral wall is in contact with an outer surface of the second peripheral wall, the first cup member of the diffuser portion is fitted into the cylindrical housing in a state in which a part of the first peripheral wall that is on the first opening side and that does not include the gas discharge port is in contact with an inner peripheral wall surface near the opening of the second end portion of the cylindrical housing, the second bottom portion of the second cup member faces toward the ignition chamber, and the second peripheral wall of the second cup member is disposed in a manner that an annular gap is formed between the second peripheral wall and the inner peripheral wall surface of the cylindrical housing, and the second end portion of the inner tube is closed by the second bottom portion of the second cup member.

The diffuser portion in the above-described embodiment includes the firs transfer of the molded articles of the transfer charge in a burning state toward the second end portion in the inner tube t cup member and the second cup member, with the openings of the first cup member and the second cup member being combined with each other.

The plurality of gas discharge ports are formed in the first peripheral wall of the first cup member, and thus, the plurality of gas discharge ports are oriented in a direction perpendicular to the axial direction of the cylindrical housing. The plurality of gas passage ports are formed in the second peripheral wall of the second cup member, and thus, the plurality of gas passage ports are oriented in a direction perpendicular to the axial direction of the cylindrical housing, and positioned to face the inner peripheral wall surface of the cylindrical housing with a gap therebetween.

A configuration in which the second end portion (the opening of the second end portion) of the inner tube is closed by the second bottom portion of the second cup member may be implemented by a configuration in which the opening of the second end portion is in contact with the second bottom portion, as well as a configuration in which the opening of the second end portion is closed by being fitted onto a convex portion formed on the second bottom portion, or a configuration in which the opening of the second end portion is fitted into a circular groove formed in the second bottom portion.

In the ignition method according to the present invention, as described in 1) and 2), the ignition chamber and the inner tube are partitioned by the closing member, and thus, when the pressure in the ignition chamber is sufficiently increased, the closing member can be ruptured to allow the ignition chamber to communicate with the interior of the inner tube.

Thereafter, as described in 3), the molded article of the transfer charge in a burning state in the ignition chamber flow into the inner tube in a vigorous manner, and a larger quantity of the molded articles of the transfer charge in a burning state is transferred toward the closed second end portion of the inner tube. As a result, the molded articles of the gas generating agent in contact with the second end portion of the inner tube close to the diffuser portion are more likely to burn, and thus, at an early stage of actuation, the combustion gas is generated and discharged from the gas discharge port. Therefore, the period of time from the actuation of the igniter until the start of discharge of the gas can be shortened.

The gas generator according to the present invention can be used as a gas generator for an airbag device mounted in an automobile, and can be particularly used as a gas generator for a side-impact airbag device that is used in a small space between an occupant and a vehicle body.

Despite the use of the elongated cylindrical housing, the gas generator according to the present invention can shorten the period of time from the actuation of the igniter until the start of gas discharge, and thus, the period of time until start of inflation of the airbag can be shortened.

Description of Embodiments

Figure 1:
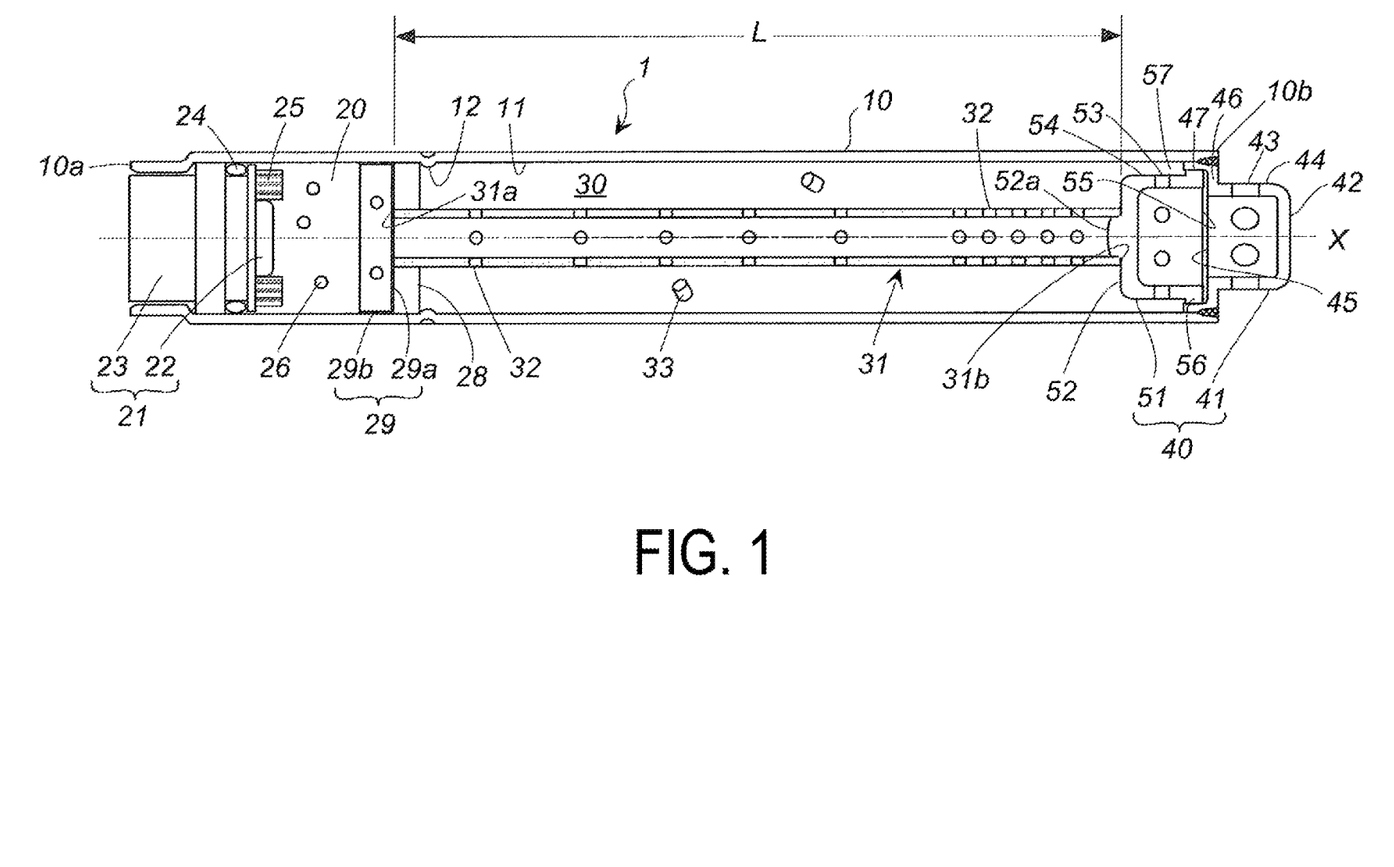
FIG. 1 is a cross-sectional view along the X-axis of a gas generator according to an embodiment of the present invention.
Figure 2:
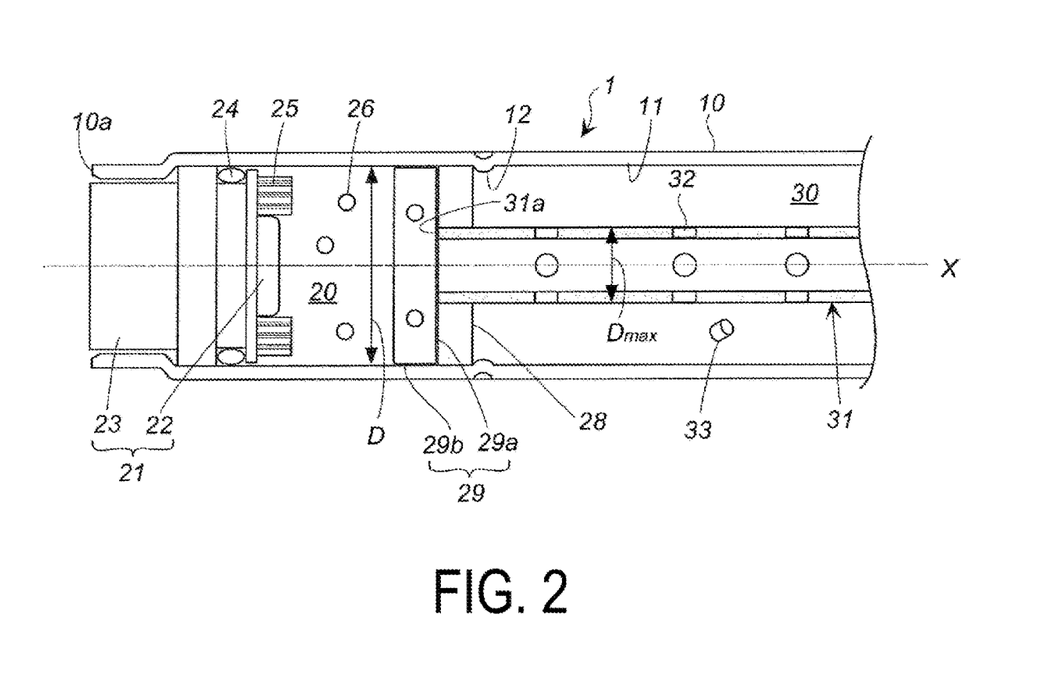
FIG. 2 is a partial enlarged view of FIG. 1.

Gas Generator (1) Gas Generator in FIGS. 1 and 2

A gas generator 1 includes an ignition chamber 20 and a diffuser portion 40, with the ignition chamber 20 being disposed on an opening side of a first end portion 10a of a cylindrical housing 10, and the diffuser portion 40 being disposed on an opening side of a second end portion 10b of the cylindrical housing 10, which is on an axially opposite side to the first end portion 10a. The gas generator 1 further includes, in the cylindrical housing 10, a combustion chamber 30 disposed between the ignition chamber 20 and the diffuser portion 40.

An igniter 21 is attached to the opening of the first end portion 10a of the cylindrical housing 10, and the opening is closed by the igniter 21. The igniter 21 is formed by integrating a metal igniter collar 23 and an igniter body including an ignition portion 22, with a resin (not illustrated) interposed therebetween.

An O-ring 24 is disposed between an inner peripheral wall surface 11 of the cylindrical housing 10 and the igniter collar 23. A guide member 25 is disposed surrounding the ignition portion 22 and configured to direct, toward an closing member 29, flames and the like generated during actuation.

A molded article of the transfer charge 26, which are in a shape of a pellet-like body, are contained in the ignition chamber 20. The molded article of the transfer charge 26 each may have a spherical shape or a shape similar thereto, or may have a cylindrical shape.

The ignition chamber 20 and the combustion chamber 30 are partitioned from each other by the closing member 29 including a bottom portion 29a and a side portion 29b. The closing member 29 is press-fitted in the cylindrical housing 10 and is supported by the molded article of the transfer charge 26 contained within the ignition chamber 20.

The diffuser portion 40 including a first cup member 41 and a second cup member 51 is attached on the opening side of the second end portion 10b of the cylindrical housing 10.

The first cup member 41 includes a first bottom portion 42, a first peripheral wall 44 in which gas discharge ports 43 are formed, and a first opening 45. The first cup member 41 includes, on the first opening 45 side, a first flange 46 and a first annular wall 47 extending from the first flange 46 perpendicularly. The second cup member 51 includes a second bottom portion 52, a second peripheral wall 54 in which gas passage ports 53 are formed, and a second opening 55. The second cup member 51 includes, on the second opening 55 side, a short second flange 56.

A sealing tape (not illustrated) is adhered, from the inside, to either of the gas discharge ports 43 and the gas passage ports 53.

The first cup member 41 and the second cup member 51 are combined together by fitting the second opening 55 side of the second cup member 51 into the first opening 45 of the first cup member 41, and bringing the inner surface of the first annular wall 47 into contact with the second flange 56.

The first cup member 41 is fitted into and welded to the cylindrical housing 10 in a state in which the first flange 46 and the first annular wall 47 are in contact with the inner peripheral wall surface 11 near the opening of the second end portion 10b of the cylindrical housing 10. Furthermore, the second bottom portion 52 of the second cup member 51 faces the inside of the combustion chamber 30, and the second peripheral wall 54 of the second cup member 51 is disposed in a manner that an annular gap 57 is formed between the second peripheral wall 54 and the inner peripheral wall surface 11 of the cylindrical housing 10.

A hollow inner tube 31 is disposed inside the combustion chamber 30, and a molded article of the gas generating agent 33 are contained in the space surrounding the inner tube 31. The inner diameter and the outer diameter of the inner tube 31 are constant.

The ratio (Dmax/D) of the outer diameter (Dmax) of the inner tube 31 to the inner diameter (D) of the cylindrical housing 10 is about 0.35, and thus, a space in which a required quantity of the molded article of the gas generating agent 33 is contained and a space in which the inner tube 31 is disposed are ensured.

The combustion chamber 30 and the diffuser portion 40 directly communicate with each other through the gas passage ports 53 of the second cup member 51.

The inner tube 31 is closed, with the opening of the first end portion 31a thereof, which is an end portion on the ignition chamber 20 side, being in contact with the closing member 29, while the opening of the second end portion 31b thereof, which is on an axially opposite side to the first end portion 31a, being closed by being fitted onto a protruding portion 52a formed in the second bottom portion 52 of the second cup member 51.

The first end portion 31a of the inner tube 31 is fixed by fitting into a hole of an annular member 28 disposed in contact with the closing member 29.

The annular member 28 is radially supported by the inner peripheral wall surface 11 of the cylindrical housing 10, with the outer peripheral surface of the annular member 28 being in contact with the inner peripheral wall surface 11. Further, the annular member 28 is in contact with and supported, in both directions along an axis X, by the closing member 29 and a plurality of inner protruding portions 12 formed on the inner peripheral wall surface 11 of the cylindrical housing 10.

Figure 3:
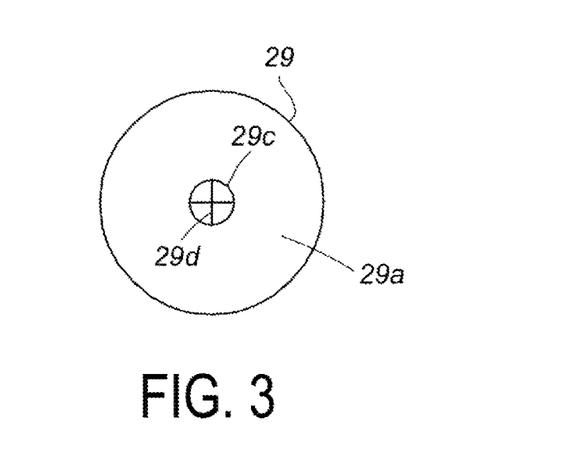
FIG. 3 is a plan view of an obstructing member in FIG. 1.

The opening of the first end portion 31a of the inner tube 31 is in contact with the closing member 29 and surrounds a circular rupturable portion 29c of the closing member 29 (see, FIG. 3) in which a "+" shaped notch 29d is formed.

A number of through holes 32 having the same opening diameter are formed in the peripheral wall of the inner tube 31. The through holes 32 are arranged at intervals in the axial direction and evenly spaced apart in the circumferential direction. The number of the through holes 32 in the inner tube 31 increases gradually from the first end portion 31a toward the second end portion 31b, resulting in gradual increase in the opening area of the through holes 32 per unit area.

The opening diameter of the through hole 32 is smaller than the shortest portion of the molded article of the gas generating agent 33 contained in the combustion chamber 30, and thus, the molded article of the gas generating agent 33 is prevented from fitting into the through hole 32.

The inner diameter (Dmin) of the inner tube 31 is greater than the maximum length (Lmax) of the molded article of the transfer charge 26, and the ratio (Lmax/Dmin) of the maximum length (Lmax) of the transfer charge formed body to the inner diameter (Dmin) of the inner tube 31 is about 0.45.

Operation including implementation of the method for igniting and burning the molded articles of the gas generating agent 33 when the gas generator 1 illustrated in FIG. 1 is used in an airbag device will be described.

When the igniter 21 is actuated, a combustion product such as flames is generated in the ignition portion 22, and the molded articles of the transfer charge 26 in the ignition chamber 20 are ignited and burned (1)).

When the pressure in the ignition chamber 20 increases, the rupturable portion 29c of the closing member 29 (see FIG. 3) is ruptured to allow the ignition chamber 20 to communicate with the interior region of the inner tube 31 (2)).

Thereafter, the molded article of the transfer charge 26 in a burning state flow into the inner tube 31 and travel toward the second end portion 31b, resulting in a state in which a greater number of the molded articles of the transfer charge 26 in a burning state are present on the second end portion 31b side than those on the first end portion 31a side. In addition, due to the increased density of the through holes 32 on the second end portion 31b side, a greater amount of combustion products such as flame and hot gas is ejected from the through holes 32 positioned on the second end portion 31b side (3), 4)).

As a result, in the combustion chamber 30, the molded articles of the gas generating agent 33 nearer to the diffuser portion 40 begin to burn and generate combustion gas. The combustion gas flows through the gas passage ports 53 into the diffuser portion 40, and then is discharged from the gas discharge ports 43 to inflate the airbag.

Thereafter, the molded articles of the gas generating agent 33 that remain in the combustion chamber 30 are burned by the combustion product ejected from the through holes 32 of the inner tube 31 and generate combustion gas. Then, the combustion gas flows through the gas passage ports 53, and is discharged from the gas discharge ports 43 to inflate the airbag.

Note that the closing member 29 is rupturable only in a rupturable portion thereof and other portions thereof are not rupturable. Thus, all of the molded articles of the transfer charge 26 in a burning state in the ignition chamber 20 enter the inner tube 31.

When the gas generator 1 illustrated in FIG. 1 is used in this manner, ignition and combustion of the molded article of the gas generating agent 33 contained near the diffuser portion 40 are facilitated, and thus, a period of time for generating combustion gas can be shortened. As a result, a period of time from the actuation of the igniter until the start of gas discharge can be shortened, and a period of time until start of inflation of the airbag can be further shortened.

Figure 4:
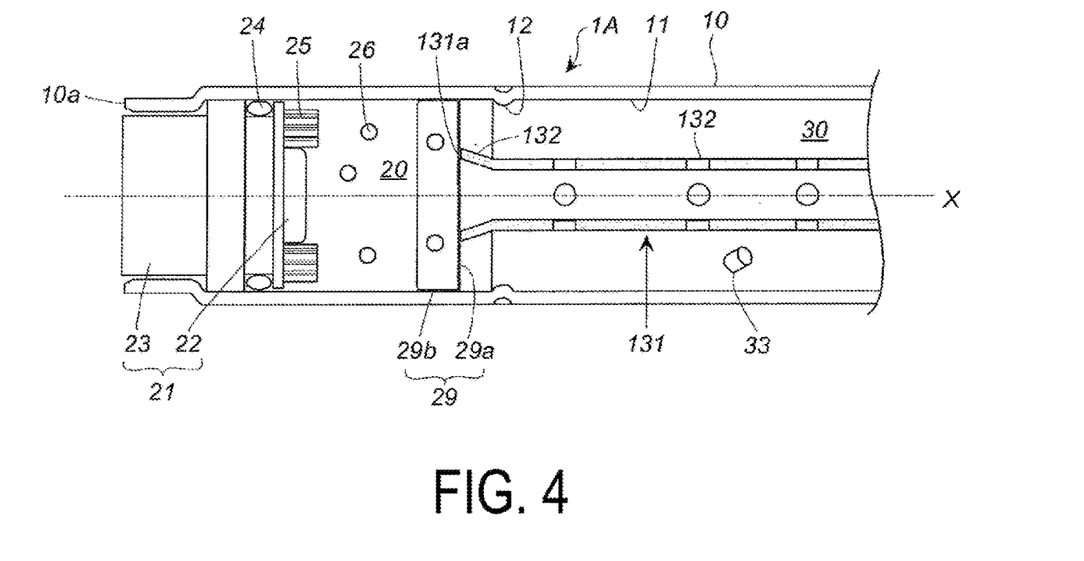
FIG. 4 is a partial enlarged cross-sectional view of another embodiment different from the embodiment illustrated in FIG. 1.

(2) Gas Generator in FIG. 4

A gas generator 1A illustrated in FIG. 4 is the same as the gas generator 1 in FIG. 1 except for the shape of the inner tube.

An inner tube 131 differs from the inner tube 31 in FIG. 1 only in that the inner tube 131 has, on a first end portion 131a side (the closing member 29 side), an annular angled wall 132 that is expanded form a funnel shape. The gas generator 1A in FIG. 4 operates similarly to the gas generator 1 in FIG. 1. However, since the first end portion 131a of the inner tube 131 has the annular angled wall 132 that is expanded to form a funnel shape, it is possible to further facilitate the molded articles of the transfer charge 26 in a burning state to be introduced into the inner tube 131.

When the inner tube 131 is used, the size of the rupturable portion 29c of the closing member 29 can also be increased correspondingly to the size of the opening of the annular angled wall 132 that is expanded to form a funnel shape.

Figure 5:
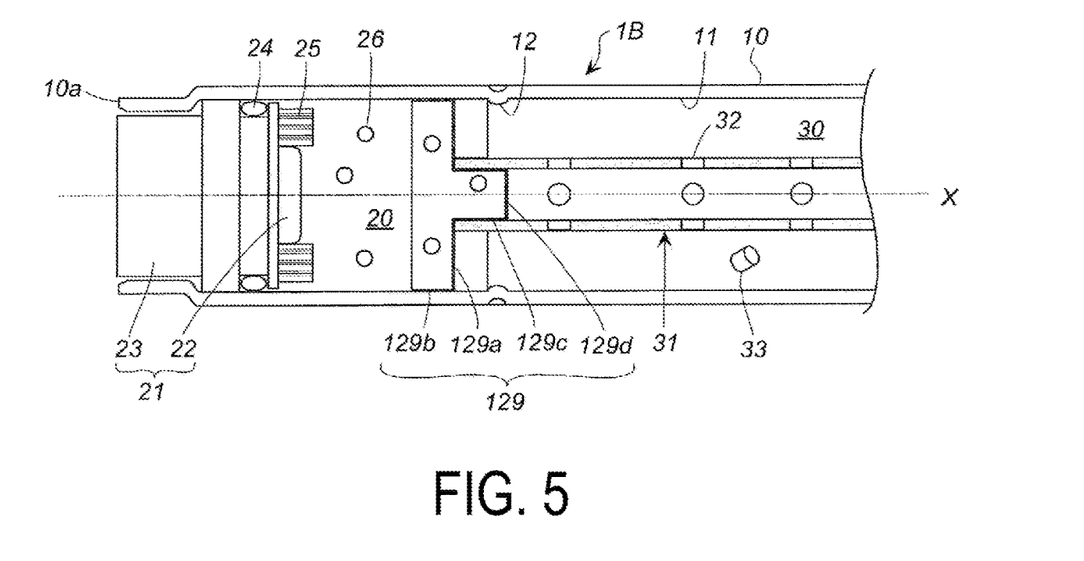
FIG. 5 is a partial enlarged cross-sectional view of another embodiment different from the embodiment illustrated in FIG. 1.

(3) Gas Generator in FIG. 5

A gas generator 1B in FIG. 5 is the same as the gas generator 1 in FIG. 1, except for the shape of an closing member 129.

The closing member 129 includes a bottom portion 129a, a side portion 129b extending from the bottom portion 129a toward the igniter 21, and a column-shaped protrusion 129c protruding, from the center portion of the bottom portion 129a, toward the opposite side to the side portion 129b. The top surface of the column-shaped protrusion 129c is a rupturable portion 129d (a portion corresponding to 29c in FIG. 3).

In this way, in the pre-actuated state, since the rupturable portion 129d of the closing member 129 is present in the inner tube 31, the quantity of the molded article of the transfer charge 26 can be increased and, upon actuation, the transfer of the molded articles of the transfer charge 26 in a burning state can be implemented more smoothly.

It is possible to employ an embodiment in which the closing member 129 in the gas generator 1B in FIG. 5 and the inner tube 131 in the gas generator 1A in FIG. 4 are combined.

The present invention is provided as described above. Of course, the present invention includes variations in various forms within the scope thereof, and these variations are not to be regarded as departure from the scope of the invention. Also, all modifications that will be clearly deemed by one skilled in the art to be variation of the present invention are included within the scope of the following claims.

The invention claimed is:

1. A gas generator, comprising:
an ignition chamber including an igniter provided at one end of a cylindrical housing;
a diffuser, including a gas discharge port, provided at an opposite end of the cylindrical housing, the opposite end being on an axially opposite side of the one end; and
a combustion chamber defined inside the cylindrical housing between the ignition chamber and the diffuser and containing a molded article of a gas generating agent, the ignition chamber and the combustion chamber being partitioned by a closing member having a rupturable area,
wherein:
a molded article of a transfer charge is contained in the ignition chamber, and the rupturable area of the closing member is configured to rupture due to an increase in a pressure in the ignition chamber by an activation of the gas generator,
an inner tube is disposed in the combustion chamber and extends from the closing member toward the diffuser,
the inner tube has a plurality of through holes in a peripheral wall thereof to allow fluid communication between an inside of the inner tube and the combustion chamber, and a first end attached to the rupturable area of the closing member,
a minimum inner diameter (Dmin) of the inner tube is larger than a maximum length (Lmax) of the molded article of the transfer charge, and
the inner tube defines, therein, a hollow space, free from the molded article of the transfer charge, from the first end to a second end prior to the activation of the igniter, and allows the molded article of the transfer charge to travel towards the second end of the inner tube after the rupturable area is ruptured.

2. The gas generator according to claim 1, wherein the molded article of the transfer charge contained in the ignition chamber is a pellet, and a ratio (Lmax/Dmin) of a maximum length (Lmax) of the pellet to a minimum inner diameter (Dmin) of the inner tube is in a range from 0.1 to 0.6.

3. The gas generator according to claim 1, wherein:
opening area per unit area of the plurality of through holes formed in the peripheral wall of the inner tube increases gradually as the inner tube extends from the first end toward the second end, and
an opening diameter of the plurality of through holes is smaller than a shortest portion of the molded article of the gas generating agent contained in the combustion chamber.

4. The gas generator according to claim 2, wherein:
opening area per unit area of the plurality of through holes formed in the peripheral wall of the inner tube increases gradually as the inner tube extends from the first end toward the second end, and
an opening diameter of the plurality of through holes is smaller than a shortest portion of the molded article of the gas generating agent contained in the combustion chamber.

5. The gas generator according to claim 1, wherein a ratio (Dmax/D) of a maximum outer diameter (Dmax) of the inner tube to an inner diameter (D) of the cylindrical housing is from 0.15 to 0.50.

6. The gas generator according to claim 2, wherein a ratio (Dmax/D) of a maximum outer diameter (Dmax) of the inner tube to an inner diameter (D) of the cylindrical housing is from 0.15 to 0.50.

7. The gas generator according to claim 3, wherein a ratio (Dmax/D) of a maximum outer diameter (Dmax) of the inner tube to an inner diameter (D) of the cylindrical housing is from 0.15 to 0.50.

8. The gas generator according to claim 1, wherein
the diffuser includes a combination of a first cup member and a second cup member, the first cup member includes a first bottom, a first peripheral wall including a plurality of gas discharge ports formed therein, and a first opening, and the second cup member includes a second bottom, a second peripheral wall including a plurality of gas passage ports formed therein, and a second opening,
wherein:
the first cup member and the second cup member are provided such that a side of the second opening of the second cup member is fitted into the first opening of the first cup member, and an inner surface of the first peripheral wall is in contact with an outer surface of the second peripheral wall,
the first cup member of the diffuser is fitted into the cylindrical housing in a state in which a part of the first peripheral wall that is on the first opening side and that does not include the gas discharge port is in contact with an inner peripheral wall surface near the opening of the second end of the cylindrical housing,
the second bottom of the second cup member faces toward the ignition chamber, and the second peripheral wall of the second cup member is disposed in a manner that an annular gap is formed between the second peripheral wall and the inner peripheral wall surface of the cylindrical housing, and
the second end of the inner tube is closed by the second bottom of the second cup member.

9. A method for igniting the molded article of the gas generating agent contained in the combustion chamber of the gas generator according to claim 1, the method, comprising:
1) actuating the igniter to ignite and burn the transfer charge in the ignition chamber to increase a pressure in the ignition chamber;
2) rupturing a rupturable area of the closing member by the increased pressure in the ignition chamber to allow the ignition chamber and the inner tube to communicate with each other;
3) discharging the molded article of the transfer charge in a burning state in the ignition chamber into the inner tube and transferring the molded article of the transfer charge in the burning state toward the second end; and
4) ejecting, from the plurality of through holes, a combustion product generated from the molded article of the transfer charge continuously burning in the inner tube, and igniting and burning the molded article of the gas generating agent in the combustion chamber.

10. A gas generator, comprising:
a housing;
an ignition chamber provided on a side of one end of the housing and including an igniter;
a diffuser having a gas discharge port provided at an opposite end of the housing opposite to the one end of the housing, the opposite end being on an axially opposite side of the one end;

a combustion chamber disposed within the housing and containing therein a molded article of a gas generating agent;

a closing member partitioning the combustion chamber from the ignition chamber, the closing member including a rupturable area ruptured upon an actuation of the gas generator;

a molded article of a transfer charge contained in the ignition chamber; and an inner tube, having a peripheral wall provided with a plurality of through holes and extending from the closing member toward the diffuser, disposed in the combustion chamber, the inner tube having a first end attached to the rupturable area of the closing member, and defining, outside, the combustion chamber, and defining, inside, a hollow space, free from the molded article of the transfer charge, from a first end to a second end, opposite to the first end, prior to an activation of the igniter, and upon activation of the igniter and the rupturable area ruptures, the hollow space communicates with the ignition chamber so as to transfer the molded articles of the transfer charge in a burning state through the closing member toward the second end.

11. The gas generator according to claim 10, wherein the molded article of the transfer charge contained in the ignition chamber is a pellet, and a ratio (Lmax/Dmin) of a maximum length (Lmax) of the pellet to a minimum inner diameter (Dmin) of the inner tube is in a range from 0.1 to 0.6.

12. The gas generator according to claim 10, wherein:

opening area per unit area of the plurality of through holes formed in the peripheral wall of the inner tube increases gradually as the inner tube extends from the first end toward the second end, and an opening diameter of the plurality of through holes is smaller than a shortest portion of the molded article of the gas generating agent contained in the combustion chamber.

13. The gas generator according to claim 10, wherein a ratio (Dmax/D) of a maximum outer diameter (Dmax) of the inner tube to an inner diameter (D) of the housing is from 0.15 to 0.50.

14. The gas generator according to claim 10, further comprising:

a diffuser including, a first cup member provided with a first bottom, a first peripheral wall including a plurality of gas discharge ports, and first opening, the first cup member being fitted into the housing, and a second cup member provided with a second bottom, a second peripheral wall including a plurality of gas passage ports, and a second opening, the second cup member being provided such that:

the second opening is fitted into the first opening, the second bottom faces the ignition chamber, an annular gap is formed between the second peripheral wall and the inner peripheral wall surface of the housing, and the second bottom closes the second end of the inner tube.

* * * * *